United States Patent [19]

Yamada et al.

[11] Patent Number: 4,943,479

[45] Date of Patent: Jul. 24, 1990

[54] MAGNETIC RECORDING MEDIUM

[75] Inventors: Yasuyuki Yamada; Matoko Nagao; Kazuhiko Morita, all of Kanagawa, Japan

[73] Assignee: Fuji Photo Film Co., Ltd., Kanagawa, Japan

[21] Appl. No.: 433,399

[22] Filed: Nov. 7, 1989

Related U.S. Application Data

[63] Continuation of Ser. No. 179,803, Apr. 11, 1989, abandoned.

[30] Foreign Application Priority Data

Apr. 10, 1987 [JP] Japan .................................. 62-87196

[51] Int. Cl.$^5$ .............................................. G11B 23/00
[52] U.S. Cl. ..................................... 428/331; 427/131; 428/425.9; 428/694; 428/900
[58] Field of Search ............ 428/694, 900, 331, 422.8, 428/425.9; 427/131, 44

[56] References Cited

U.S. PATENT DOCUMENTS

| | | | |
|---|---|---|---|
| 4,619,856 | 10/1986 | Kamada | 428/694 |
| 4,621,027 | 11/1986 | Okita | 428/900 |
| 4,632,878 | 12/1986 | Okita | 428/900 |
| 4,637,963 | 1/1987 | Nishimatsu | 428/900 |
| 4,671,998 | 6/1987 | Okita | 428/900 |
| 4,702,959 | 10/1987 | Shimozawa | 428/694 |

*Primary Examiner*—Paul J. Thibodeau
*Attorney, Agent, or Firm*—Sughrue, Mion, Zinn, Macpeak & Seas

[57] ABSTRACT

A magnetic recording medium, having excellent running durability and strong resistance to deformation caused by heat, is comprised of a non-magnetic support and a magnetic layer having provided therebetween, a non-magnetic under-coating comprised of a dispersion of silica fine particles and at least one binder, said binder comprising at least one polymerizable (meth)acrylate compound containing a triazine ring.

7 Claims, No Drawings

MAGNETIC RECORDING MEDIUM

This is a continuation of application Ser. No. 179,803 filed Apr. 11, 1989, now abandoned.

FIELD OF THE INVENTION

The present invention relates to a magnetic recording medium, and more particularly it relates to a magnetic recording medium having improved running durability suitable for high density recording.

BACKGROUND OF THE INVENTION

The magnetic recording medium for high density recording has been developed in recent years, and in that medium, the surface properties of the magnetic layer are required to improve more and more in order to reduce a so-called spacing loss between a magnetic head and a magnetic tape. For the above purpose, it is not only necessary to improve the surface properties of the magnetic layer by improving technologies for manufacturing a magnetic layer such as dispersing technology, coating technology or surface molding technology, but also the surface properties of the non-magnetic support. As the recording density increases, recording wavelengths decrease. Since an output level decreases (a so-called "thickness loss") as the recording wavelength decreases, the thickness of a magnetic layer is necessarily reduced so as to obviate the thickness loss. For the above reason, the surface properties of a non-magnetic support greatly influence those of a magnetic layer.

A magnetic recording medium having a thin ferromagnetic metal film comprised of Co-Ni, Co-Cr or Fe-N prepared by vapour deposition or sputtering has recently been developed to realize higher density recording. As the magnetic layer of the thin metal film type has much more reduced thickness than that of the coated type, the above described problem becomes more serious.

However, improving the surface properties of a support used in a magnetic recording medium results in some disadvantages to the recording medium. For example, when surface properties of a thus formed film are good, friction of the film against the roll for conveying the film increases at the step of winding up the film, whereby the film meanders or wrinkles. In some cases the shape of the rolled film becomes distorted due to the increased friction between films.

Many attempts have been made to solve the above-described problem. For example, a method which comprises extruding fine particles of thermoplastic resins on a support, dissolving and removing the particles by a solvent and thereafter forming a magnetic layer on the support is disclosed in Japanese Patent Application (OPI) No. 109605/78. The term "OPI" as used herein means an unexamined published application.

A method which comprises coating a solution of a polymer such as polyamide or polyester on a support, drying and forming wrinkles, and forming a magnetic layer on the support, is disclosed in Japanese Patent Publication No. 14555/71. Polyester and the like are used as a polymer to be coated on a support as described in Japanese Patent Publication No. 6117/72 or a thermoplastic polyester and the like are used to form fine wrinkles on a support as described on a support in Japanese Patent Publication No. 14555/71 and a magnetic layer is formed thereon, as disclosed in Japanese Patent Publication No. 38001/75.

However, the above-described four methods have been unsuccessful in providing a magnetic recording medium satisfactory for high density recording.

In this regard, a magnetic recording medium which is prepared by providing a non-magnetic layer containing a radiation-polymerizable compound and fine particles on a support, irradiating the layer ultraviolet rays and thereafter providing a magnetic layer thereon is disclosed in U.S. Pat. No. 4,619,856.

In accordance with the above technique, the surface properties and durability of the magnetic layer are relatively improved. But running durability is unsatisfactory and there is also a problem of heat resistance of a support provided with an under-coated non-magnetic layer. Particularly, when a thin metal magnetic film is to be formed on both surfaces of a support by vapour deposition or sputtering, after an under-coated layer is provided on both surfaces of said support and upon providing a magnetic layer on one surface by vapour deposition or sputtering, the under-coated layer on the back surface of the support has a tendency to stick to a surface of a substrate or a can. The sticking problem also takes place when a magnetic layer is provided by coating on both surfaces. That is, when a magnetic layer is subjected to a calendering treatment, an under-coated non-magnetic layer on the back surface of a support sticks to the roll for calendering.

SUMMARY OF THE INVENTION

An object of the present invention is to provide a magnetic recording medium having improved running durability.

Another object of the present invention is to reduce deformation of a support caused by heating and to provide an under-coated layer which does not stick on a substrate, a roll and the like when said support has magnetic layers on both surfaces thereof.

As a result of thorough investigations as to compounds capable of polymerizing with radiation and fine particles contained in an uncoated non-magnetic layer, the present inventors have found that the above objects can be attained by using (meth)acrylate compounds having a triazine ring as the polymerizable binder compound and silica fine particles ($SiO_2$) having from about 18 to about 1000 m$\mu$ diameter as fine particles. In fact, when silica was used as a solid particle, it hardly dispersed and it was difficult or it took a long time to prepare a coating solution. When silica is used in a fine particulate dispersed state, silica can be uniformly distributed in a short time, providing the magnetic recording medium of the present invention with the desired durability and anti-deformation properties.

The present invention relates to a magnetic recording medium comprising a non-magnetic support and a magnetic layer having provided therebetween a non-magnetic layer containing at least one binder and fine particles, said fine particles comprising silica fine particles, and 45 wt % or more of said binder being at least one polymerizable (meth)acrylate compound having a triazine ring.

DETAILED DESCRIPTION OF THE INVENTION

The present invention is preferably applied to a magnetic recording medium of a thin ferromagnetic metal film type prepared by vapour deposition or sputtering and can also be applied to a magnetic recording medium of a coated type.

The suitable binder compounds capable of polymerizing upon exposure to radiation include (meth)acrylate compounds containing a triazine ring such as tris(2-acryloyloxyethyl)isocyanurate, 2-hydroxyethyl-bis(2-acryloyloxyethyl)isocyanurate, and the compound represented by formula (I),

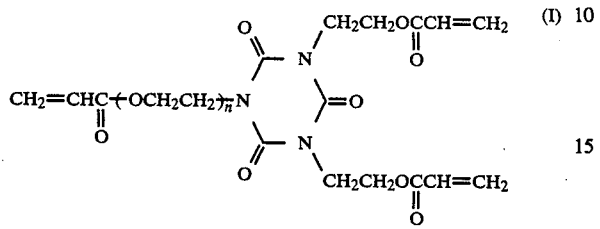

wherein n is an integer of 1 to 5.

The above described compounds are added in an amount of about 45 wt % or more, preferably about 70 wt % or more based on the total amount of binder. When the amount thereof is less than 45 wt %, stick-slip readily takes place after coating and sufficient running durability can not be obtained.

The above compounds can be used alone or in combination. Other copolymerizable compounds such as urethane (meth)acrylate, oligoester (meth)acrylate, epoxy (meth)acrylate, styrene, vinyl chloride, vinylidene chloride, diethylene glcyol diacrylate and hexamethylene diacrylate can be used alone or in combination.

Further, the compounds polymerizable upon exposure to radiation can be used in combination with conventional magnetic recording medium binders such as copolymers of vinyl chloride and vinyl acetate, cellulosic resins, acetal resins, copolymers of vinyl chloride and vinylidene chloride, urethane resins, and copolymers of acrylonitrile and butadiene.

The fine particles used in the present invention are silica fine particles derived from silica sol. "Silica sol" referred to herein is a dispersion of amorphous silicic anhydride fine particles (silica) dispersed in an organic solvent. The silica sol used in the present invention generally contains silica particles in an amount of 10 to 60 wt % and preferably 15 to 40 wt %, and the silica particles have a diameter of from about 18 to about 1000 mμ and preferably from about 30 to about 250 mμ. As described above, such silica fine particles as a solid particle hardly disperse in a binder coating solution. However, when silica particles are used as a silica sol dispersion (for example, "OSCAL", manufactured by SHOKUBAI KASEI KOGYO CO., LTD.; composition: 21 wt % SiO$_2$, 1 wt % H$_2$O, and 78 wt % isopropyl alcohol) dispersed, for example, in methanol, isopropyl alcohol or toluene, dispersibility thereof is good, and a uniform coating solution can be obtained. When the uniform coating solution is coated onto the support as an under-coated non-magnetic layer and then dried to remove solvent, a uniformly dispersed layer of silica fine particles can be obtained. In the present invention, such silica fine particles are referred to as "fine particles derived from silica sol".

The content of dried silica fine particles is from 0.01 to 20 wt %, preferably from 0.04 to 12 wt % based on the total amount of binder in the under-coated non-magnetic layer.

In the present invention, the above described binders and organic solvents containing silica sol are mixed and dispersed to prepare a uniform coating solution and the coating solution is coated onto a support.

Suitable organic solvents used for dispersing and coating in the present invention include ketones such as acetone, methyl ethyl ketone, methyl isobutyl ketone, cyclohexanone, isophorone and tetrahydrofuran; alcohols such as methanol, ethanol, propanol, butanol, isobutyl alcohol, isopropyl alcohol and methyl cyclohexanol; esters such as methyl acetate, ethyl acetate, butyl acetate, isobutyl acetate, isopropyl acetate, ethyl lactate and monoethyl ether of glycol acetate; ethers such as diethyl ether, tetrahydrofuran, glycol dimethyl ether, glycol monoethyl ether and dioxane; tars (aromatic hydrocarbons) such as benzene, toluene, xylene, cresol, chlorobenzene and styrene; chlorinated hydrocarbons such as methylene chloride, ethylene chloride, carbon tetrachloride, chloroform, ethylene chlorohydrin and dichlorobenzene; N,N-dimethylformaldehyde and hexane. Of these, methyl ethyl ketone, cyclohexanone and toluene are preferably used.

Suitable non-magnetic supports materials used in the present invention include polyesters such as polyethylene terephthalate and polyethylene-2,6-naphthalate; polyolefins such as polyethylene and polypropylene; cellulose derivatives such as cellulose triacetate; plastics such as polycarbonate, polyimide and polyamide imide; aluminum and its alloy, copper, glass and ceramics.

As described above, an under-coated non-magnetic layer is provided on a support, dried and then irradiated with radiation to polymerize the above described binder compounds.

Radiation sources include electron beams generated by an electron beam accelerating device and ultraviolet rays.

The electron beam accelerating methods include scanning, double scanning, curtain beam and a broad beam curtain.

Regarding characteristics of electron beams, the accelerating voltage is from 100 to 1000 kV, preferably from 150 to 300 kV and absorption dose is from 1.0 to 20 megarads, preferably from 2 to 10 megarads. When the accelerating voltage is less than 100 kV, the transmitted amount of energy is short. When the accelerating voltage exceeds 1000 kV, energy efficiency used for polymerization decreases and is not economical. When the absorption amount is less than 1.0 megarad, hardenable reaction is too incomplete to obtain a sufficiently strong non-magnetic layer. When the absorption amount is more than 20 megarads, efficiency of energy used for hardening reaction decreases; the irradiated object generates heat and causes deformation of the support especially plastic supports, which is unfavorable.

When ultraviolet rays are used as the source of radiation, one or more aromatic ketones such as acetophenone, benzophenone, benzoin ethyl ether, benzyl methyl ketal or benzyl ethyl ketal are added as a photopolymerization initiator. The additive amount thereof is from 1 to 10 wt % based on the total amount of binder.

A mercury lamp can be used as a source of ultraviolet rays. Mercury lamp with from 20 to 200 W/cm is used rays. Mercury lamp with from 20 to 200 W/cm is used at a rate of from 0.3 m/min to 20 m/min which can be increased by increasing the number of mercury lamps used. The distance between a support and a mercury lamp is preferably from 1 to 30 cm.

Thus, a magnetic layer of a thin ferromagnetic metal film prepared by vapour deposition or sputtering or a magnetic layer having dispersed ferromagnetic particles in a binder is provided on the thus formed non-magnetic undercoated layer.

The thin magnetic metal film used in the present invention is prepared by a method for forming a film in a vacuum chamber or by a metal plating method. The method for forming a film in a vacuum chamber is preferred in that a rate for forming a thin metal film is high, manufacturing steps are simple and treatment for waste solutions is unnecessary. The method for forming a film in a vacuum chamber includes a vacuum deposition method, a sputtering method, an ion plating method and a chemical phase plating method wherein substrate or compounds to be deposited are vaporized or ionized and deposited on a support as a steam in an inert-gas atmosphere under reduced pressure (e.g., about $10^{-5}$ to $10^{-1}$ Torr) or in a vacuum condition.

Using ferromagnetic metals such as iron, cobalt or nickel or ferromagnetic alloys such as Fe-Co, Co-Cr, Co-Ni, Fe-Si, Fe-Rh, Co-P, Co-B, Co-Si, Co-V, Co-Y, Co-La, Co-Ce, Co-Pr, Co-Sm, Co-Pt, Co-Mn, Fe-Co-Ni, Co-Ni-P, Co-Ni-B, Co-Ni-Ag, Co-Ni-Na, Co-Ni-Ce, Co-Ni-Zn, Co-Ni-Cu, Co-Ni-W, Co-Ni-Re or Co-Sm-Cu, a thin metal magnetic recording layer can be prepared in a vacuum chamber or by a plating method. The magnetic recording medium has a film thickness of from 0.05 to 2 μm, preferably from 0.1 to 0.4 μm.

The ferromagnetic particles used in a magnetic layer of a coated type magnetic recording medium in the present invention include ferromagnetic iron oxide fine particles, Co-doped ferromagnetic iron oxide fine particles, ferromagnetic chromium dioxide fine particles, ferromagnetic alloy particles and barium ferrite. Ferromagnetic iron oxide and chromium dioxide have an acicular ratio of from about 2/1 to about 20/1, preferably 5/1 or higher, and have an average length of from 0.2 to 2.0 μm. Ferromagnetic alloy particles have a metal content of 75 wt % or higher, and 80 wt % or more of the metal content is a ferromagnetic metal such as Fe, Co, Ni, Fe-Co, Co-Cr, Co-Ni or Fe-Co-Ni. The longest diameter is not greater than about 1.0 μm.

The binders commonly used in the magnetic layer include thermoplastic resins, thermosetting resins, reactive type resins and mixtures thereof.

The solvents are those that are used for coating a non-magnetic layer.

Additives such as lubricating agents, abrasive agents, dispersing agents, antistatic agents or rust-preventing agents may be added to the magnetic coating solution in the present invention.

A non-magnetic layer and a magnetic layer may be provided on either one surface or both surfaces of a support.

The present invention will be further illustrated in more detail by the following Examples.

EXAMPLE 1

A coating solution having the following composition was coated onto both surfaces of a 50 μm-thick polyimide support to form a layer having a dry thickness of 0.7 μm. Then ultraviolet rays irradiated both surfaces for 3 seconds respectively using a mercury lamp of 80 W/cm to harden the coated layers.

| | Composition | Parts by weight |
|---|---|---|
| (A) | 10% methyl ethyl ketone solution of tris-(2-acryloyloxyethyl)isocyanurate | x |
| (B) | 10% methyl ethyl ketone solution of urethane acrylate (molecular weight: 8000) | y |
| (C) | Silica sol dispersed in a mixture of isopropyl alcohol and methyl ethyl ketone in 1/1 volume ratio (solid content: 10%, average particle diameter: 80 mμ) | z |
| (D) | Benzyl ethyl ketal | 4 |

| Components | (amounts) | 1* | 2* | 3 | 4 | 5 | 6 |
|---|---|---|---|---|---|---|---|
| (A) | (x) | 0 | 20 | 45 | 70 | 85 | 100 |
| (B) | (y) | 100 | 80 | 55 | 30 | 15 | 0 |
| (C) | (z) | 8 | 8 | 8 | 8 | 8 | 8 |
| (D) | | 4 | 4 | 4 | 4 | 4 | 4 |

*Comparison

Onto one surface of the non-magnetic layer of each of the thus prepared sample Nos. 1 to 6 was formed a thin magnetic layer of Co-Cr film by sputtering in the manner described below. While sputtering was conducted, whether or not the back surface of samples stuck to the substrate was checked.

Each sample of which back surface with the undercoated layer was brought in contact with a copper substrate was put in a vacuum chamber. The chamber was degased to $3 \times 10^{-7}$ Torr and then argon gas was introduced thereinto so that the chamber pressure was $3 \times 10^{-3}$ Torr. While maintaining the substrate temperature at 170° C., Co-Cr film having 2000 Å thickness was provided with power density 3 W/cm$^2$ by DC magnetron sputtering method. After the magnetic layer was formed, the samples were checked to see whether they stuck to the substrate. A perfluoropolyether lubricating agent was coated onto the thus obtained Co-Cr film in a thickness of from about 50 to 100 Å, dried and the film was punched onto a floppy disk having a diameter of 3.5 inches. Then, the running durability test was done by recording and reproducing at 600 rpm and 500 Hz on the outermost peripheral track with a head pressure of 20 g at 23° C. and 50% RH.

The thus obtained results are shown in the following table.

TABLE

| Sample No. | Condition of whether or not samples stuck to the substrate | Running Durability |
|---|---|---|
| 1 | Sample completely stuck | Sample not available |
| 2 | " | " |
| 3 | Sample slightly stuck | 600,000 passes |
| 4 | Sample did not stick | more than 1,000,000 passes |
| 5 | " | more than 1,000,000 passes |
| 6 | " | more than 1,000,000 passes |

EXAMPLE 2

The same coating solution of Example 1, except that the following component of formula (1) was used instead of component (A), component (C) was used in an amount of 4 parts by weight and component (D) was not added, was coated onto both surfaces of a support to obtain a non-magnetic layer having a dry thickness of 0.7 μm.

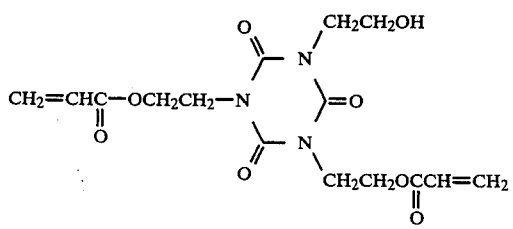

Then, electron beam irradiation was conducted to each of the non-magnetic layers at an accelerating voltage of 150 kV and a beam electric current of 5 mA with 5 Mrad.

Co-Cr films were formed on the thus obtained samples by a sputtering method in the same manner as in Example 1. Whether or not samples stuck to the base was checked and at the same time running durabilities of the samples were also tested.

TABLE

| Sample No. | Condition of whether or not samples stuck to the substrate | Running Durability |
|---|---|---|
| 7* | Sample completely stuck | Sample not available |
| 8* | " | " |
| 9 | Sample partially stuck | 800,000 passes |
| 10 | Sample did not stick | more than 1,000,000 passes |
| 11 | " | more than 1,000,000 passes |
| 12 | " | more than 1,000,000 passes |

EXAMPLE 3

The same coating solution of Example 1 was coated onto both surfaces of a support to obtain a non-magnetic layer having a dry thickness of 0.7 μm, except that the following component as represented by formula (2) was used instead of component (A) and 16 parts by weight of the component (C) were used.

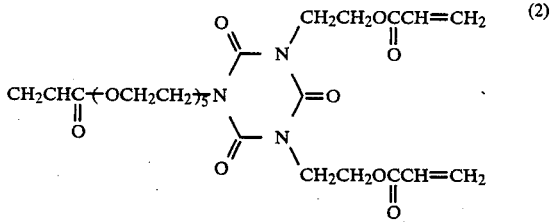

Similar to Examples 1 and 2, UV irradiation was conducted on the non-magnetic layer, Co-Cr film was provided by a sputtering method and whether or not samples on back surface struck to the base and running durabilities were checked.

TABLE

| Sample No. | Condition of whether or not samples stuck to the substrate | Running Durability |
|---|---|---|
| 13* | Sample completely stuck | Sample not available |
| 14* | " | " |
| 15 | Sample partially stuck | 900,000 passes |
| 16 | Sample did not stick | more than 1,000,000 passes |
| 17 | " | more than 1,000,000 passes |
| 18 | " | more than 1,000,000 passes |

*Comparison

It is clear from the results that the magnetic recording medium of the present invention having a nonmagnetic layer (an under-coated layer) has excellent running durability. When a magnetic layer is provided, the undercoated layer on the back surface of a support does not stick to a substrate, thereby improving resistance to heat deformation of a support.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support and a thin ferromagnetic metal film prepared by vapor deposition or sputtering having provided between said support and said thin ferromagnetic metal film a non-magnetic undercoated layer comprising at least one binder and a dispersion of fine silica particles derived from silica sol having a diameter in the range from about 18 mμ to about 1000 mμ, wherein the silica fine particles are present in said non-magnetic undercoated layer, after drying, in an amount from about 0.01 wt % to about 20 wt %, based upon the total amount of binder in said layer and wherein at least about 45 wt % of the total amount of binder comprises at least one polymerizable (meth)acrylate compound having a triazine ring.

2. A magnetic recording medium according to claim 1, wherein the fine silica particles have a diameter in the range from about 30 mμ to about 250 mμ.

3. A magnetic recording medium according to claim 1, wherein said (meth)acrylate compound is at least one selected from the group consisting of tris(2-acryloyloxyethyl)isocyanurate, 2-hydroxyethyl-bis-(2-acryloyloxyethyl)isocyanurate, and a compound represented by the following formula

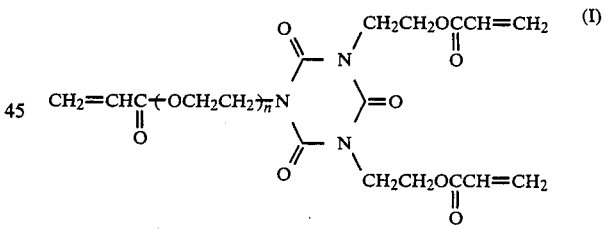

wherein n is an integer of from 1 to about 5.

4. A magnetic recording medium according to claim 1, wherein said at least one polymerizable (meth)acrylate compound comprises at least about 70 wt % of the total amount of binder.

5. A magnetic recording medium according to claim 1, wherein the amount of said silica fine particles is between about 0.04 wt % and about 12 wt %.

6. A magnetic recording medium according to claim 1, wherein said binder additionally comprises at least one copolymerizable compound selected from the group consisting of urethane (meth)acrylate, oligoester (meth)acrylate, epoxy (meth)acrylate, styrene, vinyl chloride, vinylidene chloride, diethylene glycol diacrylate, and hexamethylene diacrylate.

7. A magnetic recording medium according to claim 1, wherein said polymerizable binder is polymerized by irradiating said non-magnetic layer after the non-magnetic layer has dried.

* * * * *